United States Patent
Young et al.

(10) Patent No.: US 9,820,323 B1
(45) Date of Patent: Nov. 14, 2017

(54) WIRELESS AUDIO TETHERING SYSTEM

(71) Applicant: BOSE CORPORATION, Framingham, MA (US)

(72) Inventors: Douglas Warren Young, Arlington, MA (US); Nathan A. Blagrove, Wayland, MA (US); Joshua James Deane, Wayland, MA (US); Graeme Reed, Charlestown, MA (US); Naganagouda Patil, Ashland, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/358,397

(22) Filed: Nov. 22, 2016

(51) Int. Cl.
| | |
|---|---|
| H04B 5/00 | (2006.01) |
| H04W 76/02 | (2009.01) |
| H04W 4/00 | (2009.01) |
| H04B 1/3827 | (2015.01) |
| H04L 29/06 | (2006.01) |
| H04W 88/04 | (2009.01) |
| G06F 3/16 | (2006.01) |

(52) U.S. Cl.
CPC ......... *H04W 76/025* (2013.01); *H04B 1/385* (2013.01); *H04L 65/4084* (2013.01); *H04W 4/008* (2013.01); *G06F 3/165* (2013.01); *H04B 2001/3866* (2013.01); *H04W 88/04* (2013.01)

(58) Field of Classification Search
USPC ................. 455/41.1–41.3, 550.1, 556.1, 566
See application file for complete search history.

(56) References Cited

U.S. PATENT DOCUMENTS

| | | | |
|---|---|---|---|
| 7,742,740 B2 | 6/2010 | Goldberg et al. | |
| 7,865,137 B2 | 1/2011 | Goldberg et al. | |
| 7,916,877 B2 | 3/2011 | Goldberg et al. | |
| 7,917,082 B2 | 3/2011 | Goldberg et al. | |
| 8,023,663 B2 | 9/2011 | Goldberg | |
| 8,170,486 B2 | 5/2012 | Olofsson | |
| 8,391,792 B2 | 3/2013 | Glezerman et al. | |
| 8,433,243 B2 | 4/2013 | Sharma | |
| 8,706,038 B2 | 4/2014 | Sharma | |
| 8,768,252 B2 * | 7/2014 | Watson ..................... | H04R 5/02 381/300 |
| 8,923,747 B2 * | 12/2014 | Tan .................... | G06Q 30/0601 455/3.01 |
| 9,191,988 B2 | 11/2015 | Newham | |
| 9,544,689 B2 * | 1/2017 | Fisher ...................... | H04R 5/04 |

(Continued)

FOREIGN PATENT DOCUMENTS

GB 2382952 A 6/2003

*Primary Examiner* — Fayyaz Alam
(74) *Attorney, Agent, or Firm* — Lando & Anastasi, LLP

(57) ABSTRACT

A wireless audio device tethering system is provided for including an intermediary device having at least one wireless transceiver that is configured to establish a first wireless connection with a first wireless audio device and a second wireless connection with a second wireless audio device. The intermediary device is also configured to receive a unique identifier from the second wireless audio device and to transmit the unique identifier to the first wireless audio device in order to initiate wireless tethering between the first and second wireless audio device. Once tethering has been initiated, wireless audio signals can be streamed to the first wireless audio device and then re-streamed to the second wireless audio device.

27 Claims, 14 Drawing Sheets

(56) References Cited

U.S. PATENT DOCUMENTS

| | | | |
|---|---|---|---|
| 2009/0154739 A1* | 6/2009 | Zellner | H04R 1/1041 381/311 |
| 2009/0238375 A1* | 9/2009 | Pilati | H04L 1/004 381/79 |
| 2010/0284389 A1* | 11/2010 | Ramsay | G06F 17/30017 370/338 |
| 2012/0087503 A1* | 4/2012 | Watson | H04S 3/008 381/23 |
| 2017/0083284 A1* | 3/2017 | Fisher | H04R 5/04 |

* cited by examiner

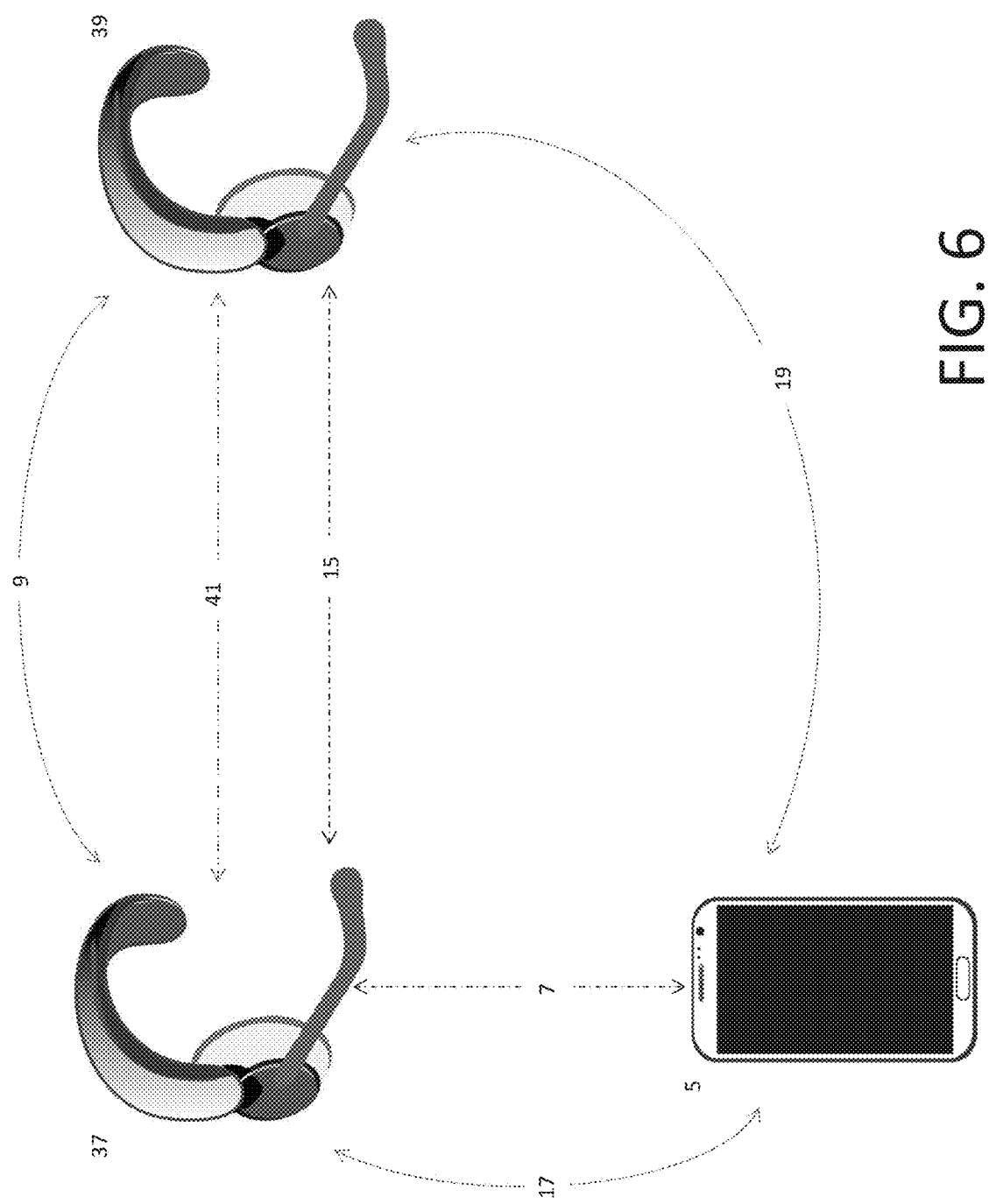

WIRELESS AUDIO TETHERING SYSTEM

FIELD

This disclosure relates to systems, methods, and apparatuses for tethering wireless audio devices together such that multiple devices may play sounds produced from a single source.

BACKGROUND

Traditionally, when two people wished to listen to the same audio source on separate headphones they have used a splitter wire that allows audio signals to be transmitted to two devices simultaneously. However, it has proven difficult to listen to the same audio source through a wireless connection because most commercially available audio sources only permit audio to be streamed over a single Bluetooth connection at a time, allowing stereo audio to be streamed via the Advanced Audio Distribution Profile (A2DP) from an A2DP source to a single A2DP receiver (such as a set of Bluetooth headphones or speakers).

In order to address this shortcoming, some Bluetooth chipsets, such as Cambridge Silicon Radio Ltd.'s BlueCore5™ CSR8670 Multimedia Bluetooth® with True Wireless capabilities, have implemented software to allow a pair of headphones to tether together. To do so, a first headphone accepts a wireless audio stream from a source and retransmits the audio via another audio stream to a second headphone, allowing both headphones to listen to the same audio from a source device. However, the process for wirelessly pairing and connecting a set of headphones has proved cumbersome with tethering controls provided as buttons on the headphones, themselves. Thus, there exists a need for user-friendly systems, methods, and apparatuses for tethering wireless audio devices together, such that multiple devices may play sounds produced from a single audio source using a tethering application at the audio source.

SUMMARY

This disclosure relates to systems, methods, and apparatuses for tethering wireless audio devices together, such that multiple devices may play sounds produced from an audio source using a tethering application on the audio source. All examples and features mentioned below can be combined in any technically possible way.

In one example, a wireless audio device tethering system includes an intermediary device having at least one wireless transceiver. The intermediary device is configured to establish at least a first wireless connection with a first wireless audio device and at least a second wireless connection with a second wireless audio device. The intermediary device is also configured to receive wireless pairing information, such as the MAC address or other unique identifier, from the second wireless audio device and to transmit the pairing information to the first wireless audio device so that a third wireless connection can be established between the first and second wireless audio devices based on the wireless pairing information. In some examples, the first and third wireless connections operate on the same channel. In other examples, the intermediary device also includes an audio source capable of streaming wireless audio signals to at least the first wireless audio device. The second wireless connection may also be a Bluetooth low energy signal. In such examples, the first wireless connection may be a Bluetooth low energy signal, a Bluetooth Serial Port Profile signal, or an iPod Accessory Profile signal to the first wireless audio device. In some examples, the first wireless audio device and the second wireless audio device may be headsets including at least one speaker and at least one microphone for receiving voice data.

In other examples of the system, the intermediary device may transmit streaming audio data over a fourth wireless connection. The fourth wireless connection may be a Bluetooth wireless connection and the audio data may be streamed using the Bluetooth advanced audio distribution profile. In other examples, the third wireless connection may be a Bluetooth wireless signal for streaming the audio data to the second wireless audio device using the Bluetooth advanced audio distribution profile. The third wireless connection may also be a Bluetooth wireless connection for streaming voice data using the Bluetooth Hands-Free Profile. In such examples, the first wireless audio device and the second wireless audio device may be headsets including at least one speaker and at least one microphone for receiving voice data, headphones, or a sound system. The intermediary can also be a smartphone, a tablet, a laptop computer, or a sound system.

In other examples, the wireless audio device tethering system may include a second intermediary device that is at least initially in digital communication with the second wireless audio device. In such examples, the first intermediary device may be configured to receive the wireless pairing information, such as a unique identifier, from the second wireless audio device through the second intermediary device. The intermediary device can also receive user inputs via a graphical user interface, with user inputs indicating a desire to tether the first wireless audio device with the second audio device.

A method for tethering wireless audio devices is also provided for, including the steps of establishing a first wireless connection between a first audio source and a first intermediary device for transmitting control information, establishing a second wireless connection between the first intermediary device and a second wireless audio device, receiving wireless pairing information, such as a unique identifier, at the first intermediary device regarding the second wireless audio device via the second wireless connection, transmitting the wireless pairing information, such as a unique identifier, to the first wireless audio device via the first wireless connection, transmitting an instruction to the first wireless audio device, via the first wireless connection, to initiate wireless tethering between the first wireless audio device and the second wireless audio device for streaming audio data to the second wireless audio device via a third wireless connection, and transmitting audio data to the first wireless audio device for streaming to the second wireless audio device via the third wireless connection. In some examples, the first wireless connection and the third wireless connection are formed over the same wireless channel. In other examples, the audio data is also transmitted from the first intermediary device to the first wireless audio device. The second wireless connection may also be a Bluetooth low energy signal and the first wireless connection may be a Bluetooth low energy signal, a Bluetooth serial port profile signal, or an iPod Accessory Profile signal.

In some examples, the method may also include the steps of establishing a fourth wireless connection between the first intermediary device and the first wireless audio device and wherein the audio data is transmitted to the first wireless audio device over the fourth wireless connection using the Bluetooth Advanced Audio Distribution Profile. The third wireless connection may also be a Bluetooth wireless signal and the audio data may be transmitted using the Bluetooth Advanced Audio Distribution Profile. In some examples, the second wireless connection may be made over a wide area network. The method may also include transmitting an instruction to the first wireless audio device, via the first wireless connection, to initiate wireless tethering between the first wireless audio device and the second wireless audio device for transmitting voice data via a fifth wireless connection. In such examples, the fifth wireless connection may be a Bluetooth wireless signal and the voice data may be transmitted using the Bluetooth Hands-Free Profile.

A wireless audio device tethering system is also provided, which includes an intermediary device that has a processor, memory in communication with the processor, a transceiver in communication with the processor for communicating wirelessly with at least a first wireless audio device and a second wireless audio device, and a display in communication with the processor and the processor is configured to provide a user interface. The user interface includes a home screen including at least one selectable tethering button for initiating a tethering request between the first and second wireless audio devices, a tethering screen including a graphical depiction of at least the first wireless audio device and the second wireless audio device. The user interface may also allow the graphical depictions to be dragged and dropped on the other, thereby initiating wireless tethering between the first and second wireless devices.

BRIEF DESCRIPTION OF THE DRAWINGS

Various aspects of at least one implementation of a wireless headphone tethering system are discussed below with reference to the accompanying figures. The figures are provided for the purposes of illustration and explanation and are not intended as a definition of the limits of the disclosure.

FIG. 6 is a schematic of a pair of voice-enabled headsets that have been tethered to one another in another example of the present disclosure.

DETAILED DESCRIPTION

It should be understood that the following descriptions are not intended to limit the disclosure to an exemplary implementation. To the contrary, it is intended to cover alternatives, modifications, and equivalents as may be included within the spirit and scope of the described subject matter.

Figure 1:
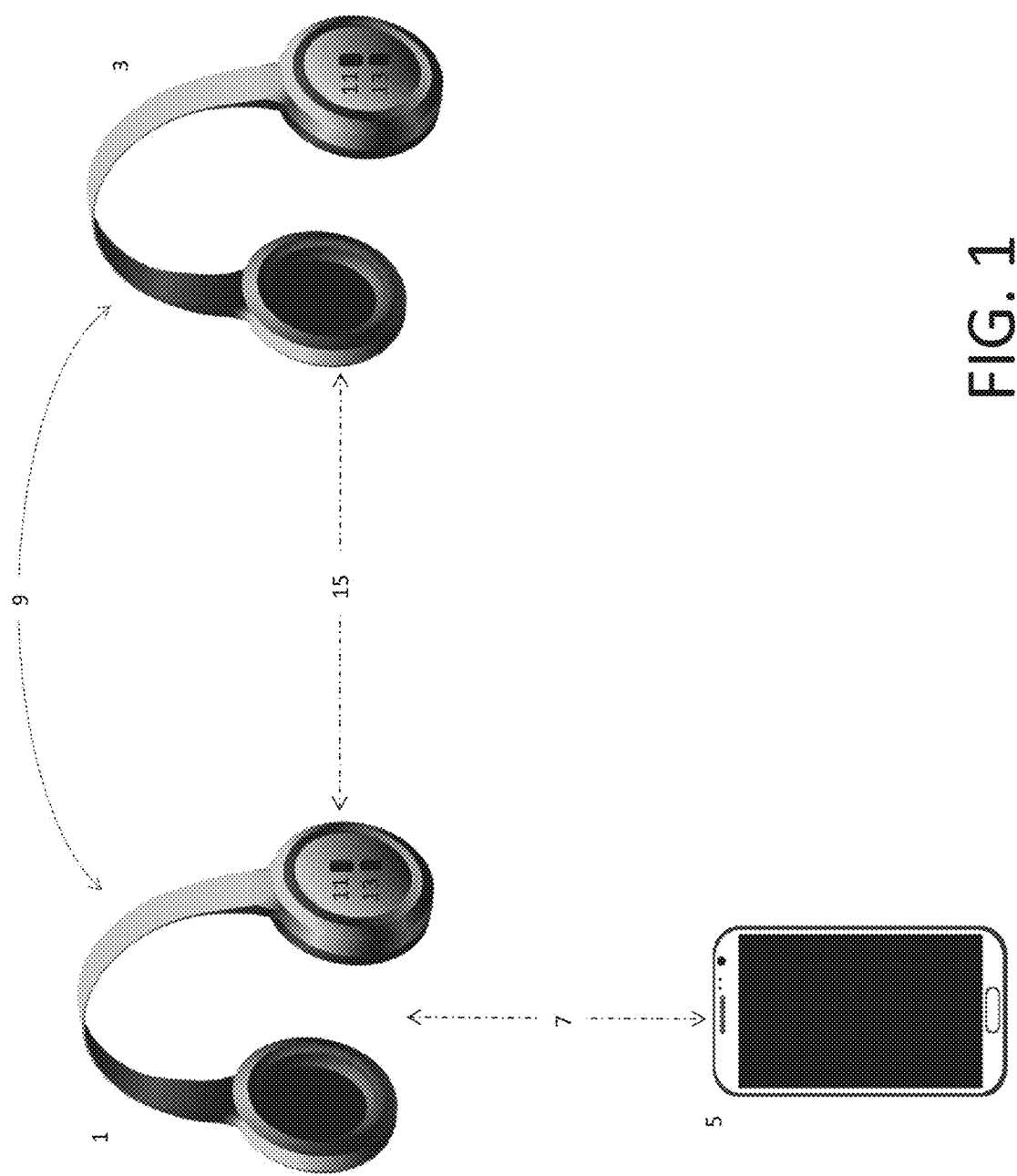
FIG. 1 is a schematic of a pair of wireless headphones that have been tethered to one another.

FIG. 1 is a schematic of a pair of wireless headphones that have been tethered to one another using known methods. In this example, an audio source 5 may be paired with master headphones 1 via a first Bluetooth connection 7, which is configured to transfer audio signals via the A2DP profile. Any Bluetooth-enabled device capable of streaming audio via the A2DP profile (or similar profiles) may be used as an audio source 5, such as a smart phone (as shown in FIG. 1), tablet, laptop, or other audio devices. Master headphones 1 may be a Bluetooth-enabled wireless headphone equipped with a Bluetooth chipset capable of tethering with another A2DP-enabled wireless headphone. The Bluetooth chipset may be Cambridge Silicon Radio Ltd.'s BlueCore5™ CSR8670 Multimedia Bluetooth® with True Wireless capabilities, for example. As shown in FIG. 1, a second pair of headphones 3 may also be provided for. Slave headphones 3 may also be a pair of Bluetooth-enabled wireless headphones, with A2DP capabilities. In some examples, slave headphones 3 may also include a Bluetooth chipset capable of tethering with another A2DP-enabled wireless headphone.

Master headphones 1 and slave headphones 3 may also include a series of buttons or other inputs for enabling a tethering session, such as beacon button 11 and inquiry button 13, which allow master headphone 1 to tether to slave headphone 3. In this example, when a user of slave headphones 3 wishes to tether to master headphone 1, he or she may press beacon button 11 in order to make slave headphones 3 discoverable by other Bluetooth-enabled devices. If the user of master headphones 1 also wishes to tether, he or she may press inquiry button 13, which places master headphones 1 into an inquiry mode, whereby it will attempt to connect with any available devices via a Bluetooth connection, such as slave headphone 3.

Once master headphones 1 has discovered slave headphones 3, slave headphones 3 transmits service discovery protocol (SDP) records to master headphones 1 via a Bluetooth signal 9. The SDP records include all of the necessary information about slave headphones 3 in order to complete a second Bluetooth connection 15, including an indication that slave headphones 3 supports the True Wireless feature. Once the SDP records have been transmitted, master headphones 1 and slave headphones 3 may pair over second Bluetooth connection 15 and establish an A2DP connection.

Upon establishing the second Bluetooth connection 15, audio signals, for example music, may then be streamed from audio source 5, to master headphones 1 via the first Bluetooth connection 7. Master headphones 1 may then stream the same streaming audio information to slave headphones 3 via the second Bluetooth A2DP connection 15. As one of ordinary skill in the art will appreciate, the Bluetooth chipset within master headphones 1 may also include software to synchronize the audio playback between master headphones 1 and slave headphones 3, for example, by buffering the audio playback at master headphones 1, in order to provide the necessary delay for transmitting the audio signals to slave headphones 3.

Figure 2:
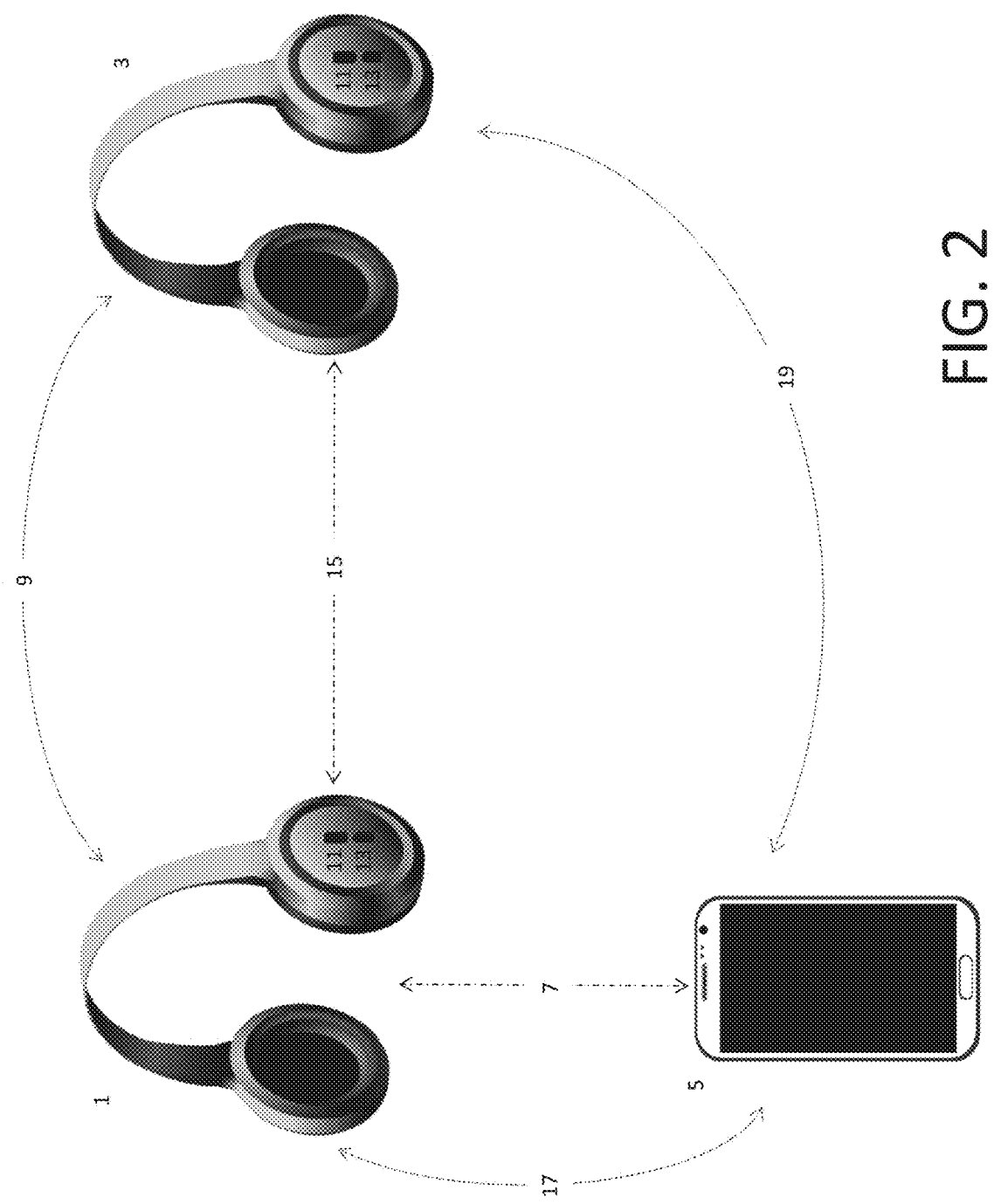
FIG. 2 is a schematic of a pair of wireless headphones that have been tethered to one another in an example of the present disclosure.

FIG. 2 is a schematic of a pair of wireless headphones that have been tethered to one another in an example of the present disclosure without the need for mechanical discovery and pairing, such as by using beacon button 11 and inquiry button 13. In this example, pairing between master headphones 1 and slave headphones 3 may be accomplished and controlled by the audio source 5. In this example, the audio source may be equipped with tethering software for monitoring any available wireless devices that may be available for tethering to master headphones 1 and accepting inputs from a user to initiate tethering to another device, such as the Bose Connect application. As shown, audio source 5, which may be equipped with tethering software, may be paired with master headphones 1 via a first Bluetooth connection 7. Again, Bluetooth connection 7 may be configured to transfer audio signals via the A2DP profile or any other suitable wireless profiles for streaming digital audio. Master headphones 3 may also include a Bluetooth chipset configured for tethering with other A2DP-enabled Bluetooth devices, such as Cambridge Silicon Radio Ltd.'s BlueCore5™ CSR8670 Multimedia Bluetooth® with True Wireless capabilities, for example. Slave headphones 3 may also be a pair of Bluetooth-enabled wireless headphones, with A2DP capabilities, and may also include a Bluetooth chipset capable of tethering with another A2DP-enabled wireless headphone.

In this example, while master headphones 1 is paired with the audio source via an A2DP Bluetooth connection, it simultaneously maintains communication with the tethering software running on audio source 5, such as the Bose Connect application, via a secondary Bluetooth signal 17. The secondary signal may be any Bluetooth signal capable of coexisting with Bluetooth connection 7 and transferring control information between master headphone 1 and audio source 5. In some examples, secondary Bluetooth signal 17 may be a Bluetooth low energy (BLE) signal, a Serial Port Profile (SPP) signal, an iPod Accessory Profile (iAP or iAP2) signal, or any combination thereof. Slave headphones 3 may persistently or periodically transmit an advertising packet 19 via BLE that allows slave headphones 3 to be discovered by audio source 5. Using the tethering software on audio source 5, a user may then initiate a tethering session via a graphical user interface, as discussed below with respect to FIGS. 7A-7H, instead of pressing beacon button 11 or inquiry button 13 (which may still be present on the headphones although unused in this example). Based on the user's selection, audio source 5 may then begin scanning for available Bluetooth A2DP-enabled headphones within range with which to connect via BLE, such as slave headphones 3. The audio source may further be configured to search for devices that are capable of tethering, for example, using the True Wireless feature. Once audio source 5 identifies slave headphones 3, the tethering software may be configured to display a list of available devices to the user through a graphical user interface, as explained below. The tethering software may also include logic to identify and only display relevant devices for tethering with master headphones 1 (or any other primary device). For example, if the primary connected device is a headset, only additional headsets will be displayed, whereas a desktop sound system or home theater system may not be displayed in such examples.

If a user wishes to tether with the listed available devices, such as slave headphones 3, it may be selected via the graphical user interface of the tethering software on audio source 5. Once the user selects a graphical representation of slave headphones 3, a request for the device's unique identifier may be sent from the audio source via BLE signal 19 to slave headphones 3. Slave headphones 3 may then respond with the necessary tethering information, including its Bluetooth or MAC address via the same BLE signal 19. The tethering software running on audio source 5 may be configured to then relay this information to master headphones 1 via secondary Bluetooth signal 17 along with an instruction to initiate tethering with the selected device. To do so, master headphones 1 may establish a Serial Port Profile (SPP) connection 9 between master headphones 1 and slave headphones 3 in order to initiate a Bluetooth handshake procedure, as is familiar to one of ordinary skill in the art, which results in pairing and establishment of a second A2DP connection 15 between the two headphones. Thus, an A2DP connection may be established under the direction and control of tethering software running on audio source 5.

Upon establishing the second Bluetooth connection, audio signals may be shared between master headphones 1 and slave headphones 3. Audio signals, for example music, may be streamed from audio source 5 to master headphones 1 via the first Bluetooth connection 7. Master headphones 1 may then stream the same streaming audio information to slave headphones 3 via the second Bluetooth A2DP connection 15. As one of ordinary skill in the art will appreciate, the Bluetooth chipset within master headphones 1 may also include software to synchronize the audio playback between master headphones 1 and slave headphones 3, for example, by buffering the audio playback at master headphones 1, in order to provide the necessary delay for transmitting the audio signals to slave headphones 3 so that they may be heard by two users simultaneously.

In some examples, the above-described tethering system may be used to automatically tether a selected slave headphone 3 when it is detected as being within the same area as master headphones 1. For example, during an initial or subsequent tethering session, a user of master headphones 1 may select an option via the tethering software running on audio source 1 to automatically initiate tethering between master headphones 1 and slave headphones 3 whenever slave headphones 3 are detected as being within range for tethering. Thereafter, the tethering software will continually or periodically scan for the BLE advertising packet being transmitted by slave headphones 3. If detected, the tethering software may be configured to automatically initiate tethering, using the same process described above.

Figure 3:
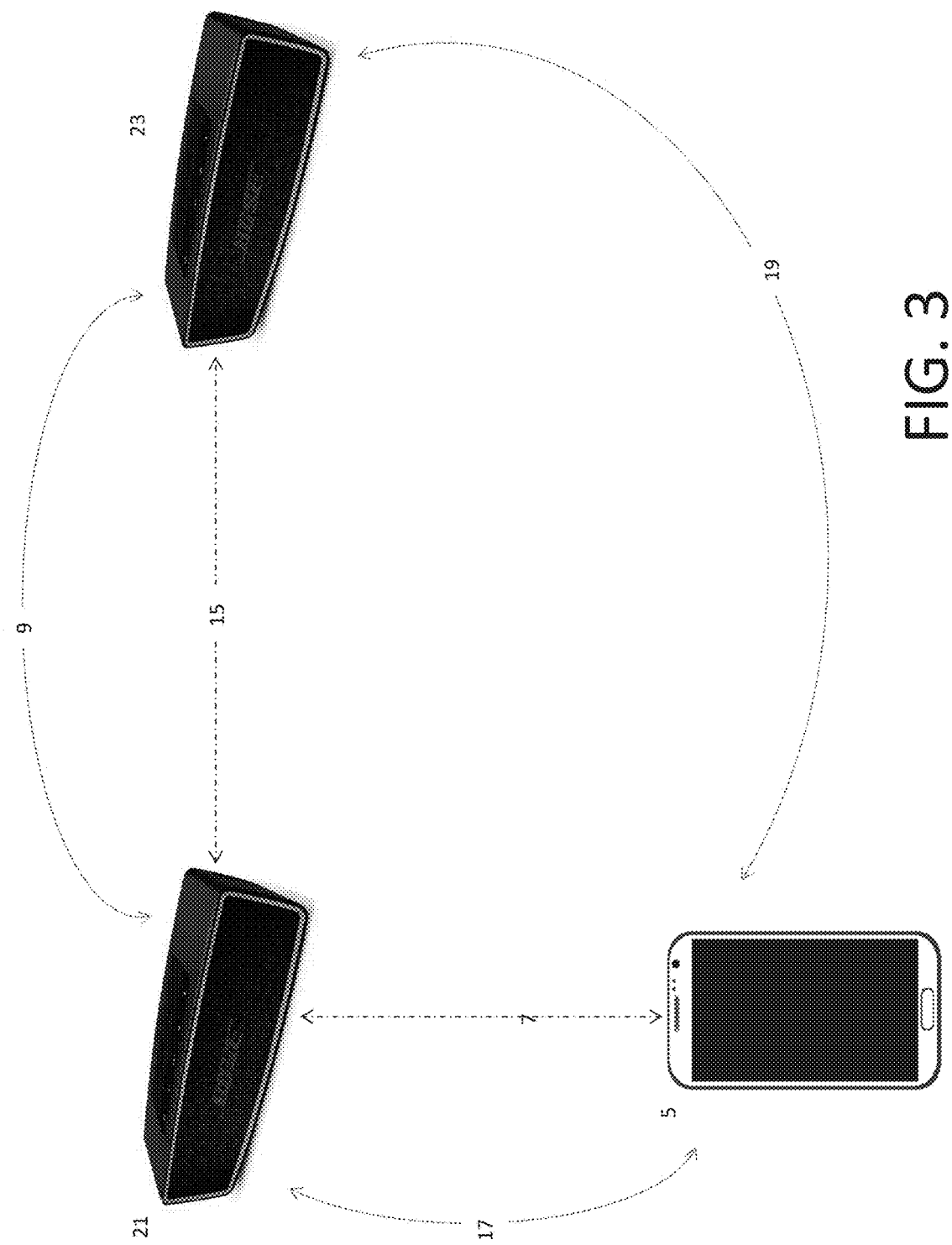
FIG. 3 is a schematic of two wireless sound systems that have been tethered to one another in an example of the present disclosure.

FIG. 3 is a schematic of a pair of wireless speakers that have been tethered to one another in an additional example of the present disclosure. In this example, an A2DP Bluetooth signal may be established between a master sound system 21 and a slave sound system 23. Both the master and slave systems may similarly be equipped with a Bluetooth chipset that permits tethering, such as Cambridge Silicon Radio Ltd.'s BlueCore5™ CSR8670 Multimedia Bluetooth® with True Wireless capabilities, for example. Tethering would proceed in the same fashion in this example, as it would in the previously discussed example, with reference to FIG. 2. Here, master sound system 21 is paired with the audio source 5 via an A2DP Bluetooth connection and also maintains communication with tethering software running on the audio source, such as the Bose Connect application, via a secondary Bluetooth signal 17. Slave sound system 23 may persistently or periodically transmit an advertising packet 19 via BLE that allows the slave sound system 23 to be discovered by audio source 5. Using the tethering software on the audio source 5, a user may then initiate a tethering session via a graphical user interface, as discussed below with reference to FIGS. 7A-7H. Based on the user's selection, audio source 5 may then begin scanning for available Bluetooth A2DP-enabled devices within range with which to connect via BLE, such as slave sound system 23, that are capable of tethering, for example, using the True Wireless feature. Once audio source 5 identifies slave sound system 23 as supporting tethering, the tethering software may display a list of available devices to the user, including slave sound system 23. In some examples, the tethering software may also include logic to identify and only display relevant devices for tethering with master sound system 21 (or any other primary device). For example, if the primary connected device is a sound system, only additional sound systems may be displayed, whereas headsets might not be displayed in this example.

If a user wishes to tether with the listed available devices, such as slave sound system 23, it may be selected via the graphical user interface of the tethering software on audio source 5. Once the user selects a graphical representation of slave sound system 23, a request for the device's unique identifier may be sent via BLE signal 19 to slave sound system 23. Slave sound system 23 may then respond with the necessary tethering information, including its Bluetooth address. The tethering software running on audio source 5 may then relay this information to sound system 21 via secondary Bluetooth signal 17 along with an instruction to initiate tethering with the selected device. To do so, master sound system 21 may establish a Serial Port Profile (SPP) connection 9 between master headphones 1 and slave sound system 23 in order to initiate a Bluetooth handshake procedure, as is familiar to one of ordinary skill in the art, resulting in pairing and establishment of an A2DP connection 15 between the two sound systems.

Upon establishing the second Bluetooth connection 15, audio signals may be shared between master sound system 21 and slave sound system 23 in the same manner as described above with respect to FIGS. 1 and 2. Audio signals, for example music, may be streamed from an audio source 5, such as a smartphone, to master sound system 21 via the first Bluetooth connection 7. Master sound system 21 may then stream the same streaming audio information to slave sound system 23 via the second Bluetooth A2DP connection 15. As one of ordinary skill in the art will appreciate, the Bluetooth chipset within master sound system 21 may also include software to synchronize the audio playback between the tethered sound systems.

Figure 4:
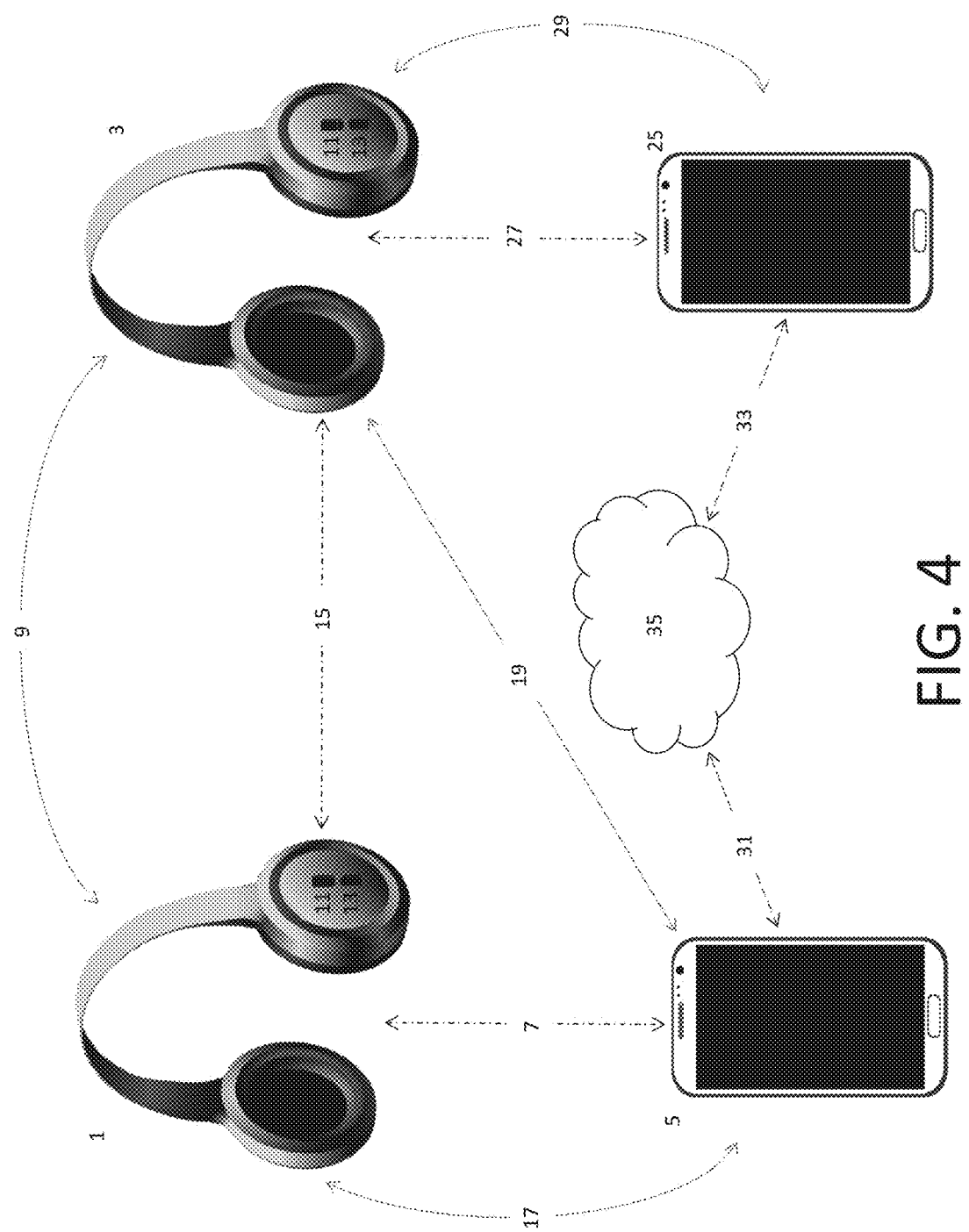
FIG. 4 is a schematic of a pair of wireless headphones that have been tethered to one another in another example of the present disclosure.

FIG. 4 is a schematic of a pair of wireless headphones that have been tethered to one another in another example of the present disclosure through an alternative process. In this example, two audio sources may be provided for, including a first audio source 5 and a second audio source 25, which may both be smart phones in some examples. Each audio source may have a wired or wireless connection to a local or wide area network 35, via network connections 31 and 33, respectively. Network 35 may be a local Wi-Fi network, a wide area network, such as the Internet, or any other means for establishing a communications link between first audio source 5 and second audio source 25. Using this communications link, audio source 5 and second audio source 25 may share information allowing master headphones 1 and slave headphones 2 to tether to one another without the need for slave headphones 3 to transmit an advertising packet 19 via BLE. In this example, second audio source 25 may initially be connected to slave headphones 3 via Bluetooth connection 27, which is configured to transfer audio signals via the A2DP profile. Slave headphones 3 may also simultaneously maintain communication with tethering software running on the second audio source 25, such as the Bose Connect application, via another secondary Bluetooth signal 29, which has the same properties as secondary Bluetooth signal 17, as discussed previously.

In this arrangement, a user of the first audio source 5 may initiate tethering via a tethering program running on the first audio source 5 by selecting a graphical representation of slave headphones 3 within a graphical user interface. In order to receive the necessary permissions and Bluetooth address to initiate the connection, the tethering software may send a signal over network 35 to the second audio source 25 indicating that the user of the first audio device wishes to tether headphones. This communication may be transmitted in a manner known to one of ordinary skill in the art based on a registry of users for the tethering application. Once the second user approves tethering via the tethering software running on the second audio source 25, the second audio source may then respond by transmitting the necessary tethering information, including the Bluetooth address of the slave headphones 3. The tethering software running on audio source 5 may be configured to then relay this information to master headphones 1 via secondary Bluetooth signal 17 along with an instruction to initiate tethering with the selected device.

Figure 5:
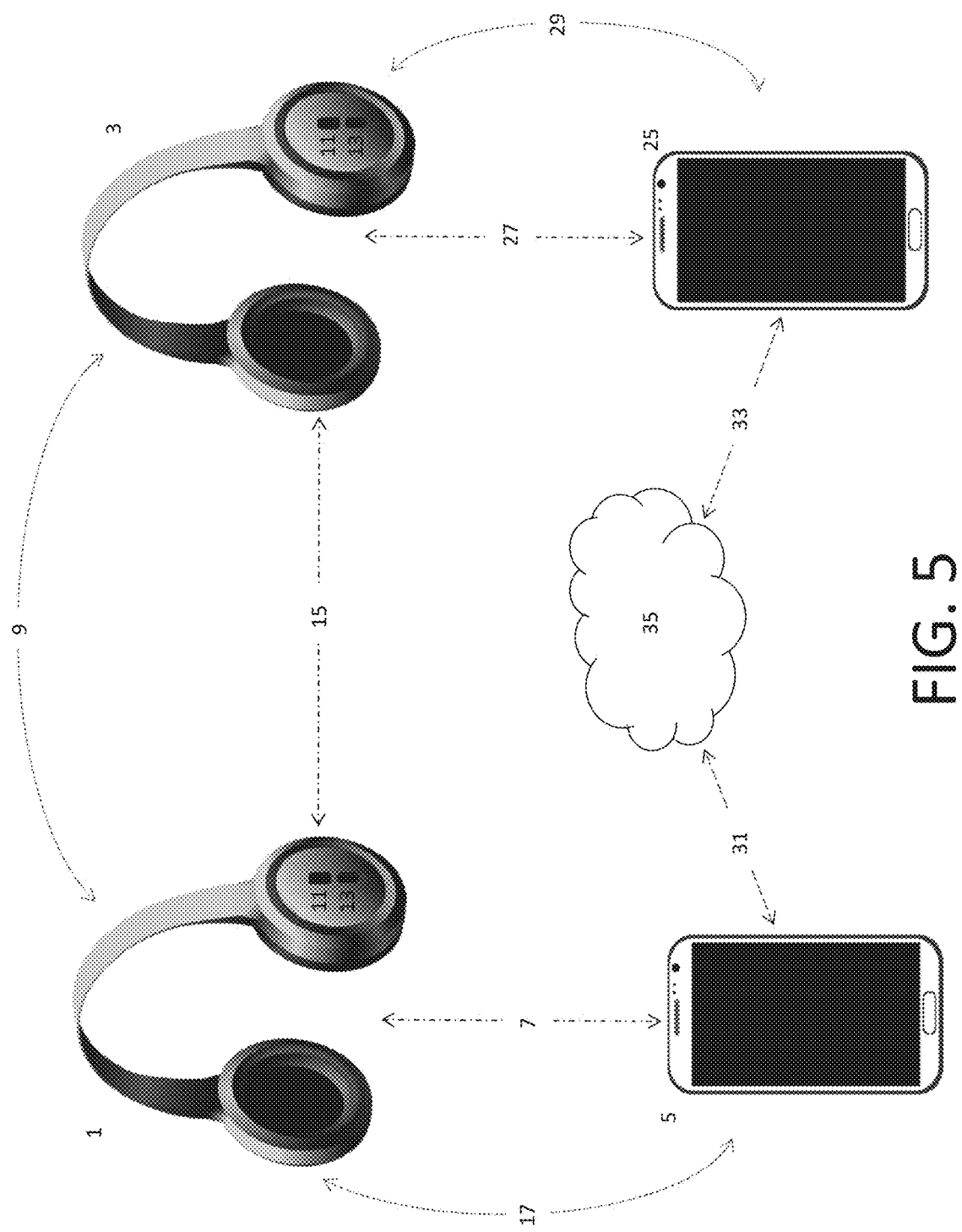
FIG. 5 is a schematic of a pair of wireless headphones that have been tethered to one another in another example of the present disclosure.

Master headphones 1 may then tether with slave headphones 3 in the same manner previously discussed. Master headphones 1 may establish a SPP connection 9 between master headphones 1 and slave headphones 3 in order to initiate a Bluetooth handshake procedure, as is familiar to one of ordinary skill in the art. This results in pairing and establishment of an A2DP connection 15 between the two headphones. Thus, an A2DP connection may be established under the direction and control of tethering software running on a first audio source 5 and a second audio source 25. In some examples, BLE signal 19 may still be utilized to determine that slave headphones 3 is able to communicate with master headphones 1 prior to attempting to tether. In other examples, BLE signal 19 may be unnecessary (as shown in FIG. 5, for example) and tethering will simply be unsuccessful if master headphones 1 and slave headphones 3 are too far apart to initiate a tether.

In other examples, the systems, methods and apparatuses described herein for tethering audio devices may be utilized to establish a voice connection between two voice-enabled headsets. FIG. 6 shows a schematic of a pair of voice-enabled headsets, each including a pair of speakers and a microphone for receiving voice data that have been tethered to one another. In this example, a master headset 37 and a slave headset 39 may be tethered to one another using the systems and methods previously described, for example, with respect to FIG. 2, 4 or 5, above. However, during the handshaking process between master headset 37 and slave headset 39, a Hands-Free Profile (HFP) (or other wireless channel) connection 41 may also be established between master headset 37 and slave headset 39 in addition to A2DP connection 15. Thus, the present disclosure also allows for parallel HFP and A2DP connections between master headset 37 and slave headset 39, allowing for simultaneous transmission of music signals along the A2DP channel and voice data along the HFP channel. In some examples, voice and music data may only be transmitted one-at-a-time whereas in other examples, voice and music may be transmitted simultaneously, allowing for users to converse while listening to the same music together wirelessly.

One of ordinary skill in the art will also appreciate that data transfers between tethered headsets also is not limited to audio and voice data, but may include any information that may be useful to pass between tethered headsets. For example, after tethering, headsets may share heart rate or other data derived from a biometric sensor between the two headsets over the Health Device Profile (HDP) or Message Access Profile (MAP). Users may also exchange music metadata for display on a device associated with the other user, such as their headset or secondary device such as a smart phone. Such information may be exchanged over the Audio/Video Remote Control Profile (AVRCP), for example. In other examples, the tethered connection may allow one user to modifying the settings of the slave headset based on settings changes made to the master headset. Such control data may be transferred via the AVRCP or SPP profiles, for example.

FIGS. 7A-7H depict a graphical user interface for aiding a user in tethering audio devices in an example of the present disclosure. An exemplary graphical user interface may be configured for presentation on a secondary computing device, such as a smart phone, tablet, or laptop computer. FIGS. 7A-7H show the arrangement of a graphical user interface on a smart phone, for example.

Figure 7A:
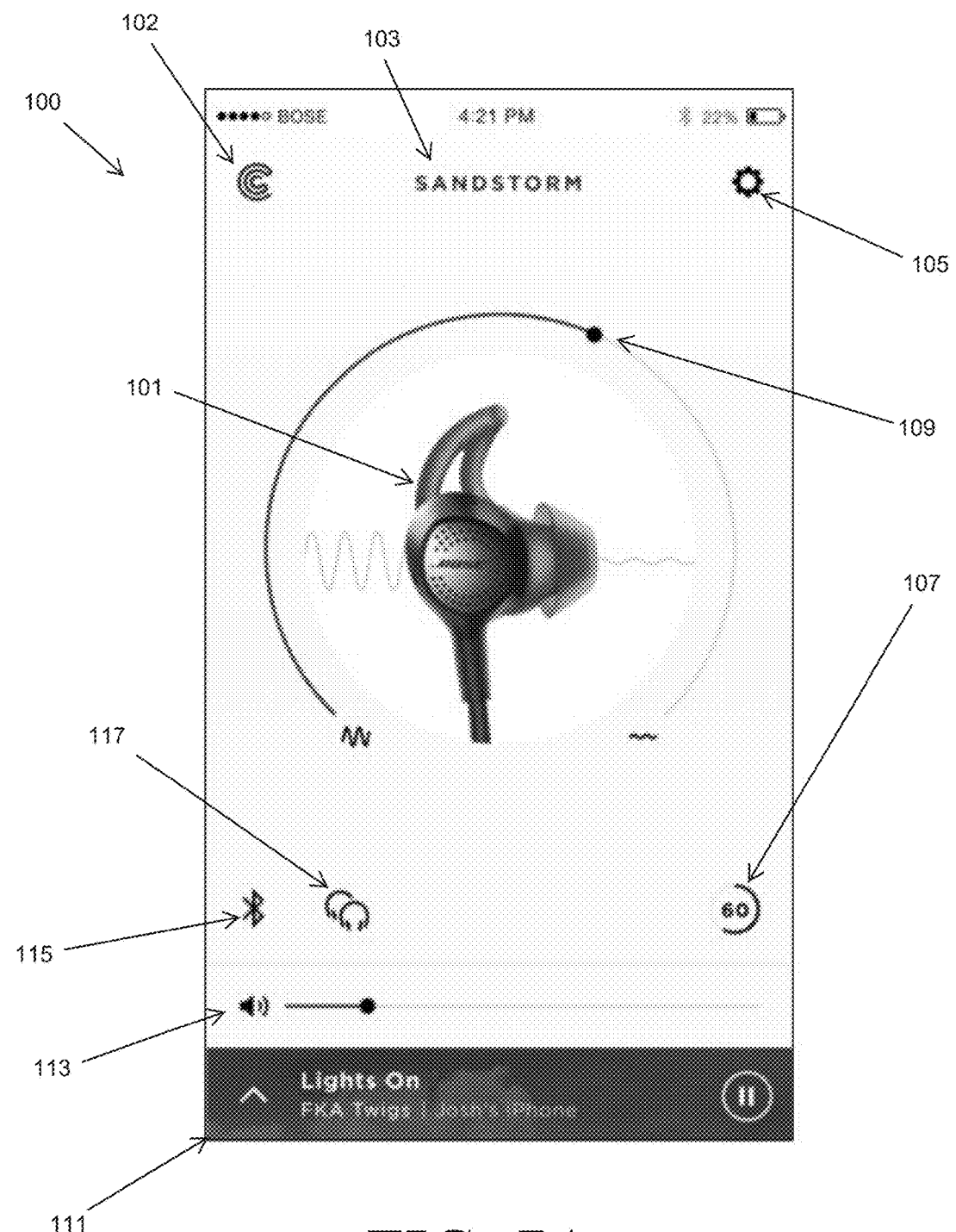
FIG. 7A is an example of a home screen for a graphical user interface for a tethering program prior to initiating tethering in one example of the present disclosure.

FIG. 7A shows an exemplary home screen for a graphical user interface 100 prior to establishing a tethered connection. As shown, a home screen may include a graphical depiction of a presently connected master device 101, along with a name associated with the master device 103. The name may be a name associated with a manufacturer, or a brand name, or may be user defined. Various buttons and sliders on the home screen may access the control mechanisms of the graphical user interface, such as an application information icon 102, for accessing information about the application, itself, such as the version number, terms and conditions, privacy policy, and any other application related information. Settings button 105 may also allow a user to access device settings associated with the master device, such as its name, a sound equalizer, its firmware status, and any other selectable features associated with the master device.

Power indicator 107 provides both a numerical and graphical depiction associated with the present battery state for the master device. Slider 109 provides ambient awareness controls for adjusting the amount of ambient sounds that are passed through the headphones, in the case of noise-cancelling headphones. Status bar 111, shown at the bottom of home screen 100, provides a toolbar that indicates a currently connected audio source, metadata regarding any audio information currently being streamed to the master device, along with a play/pause button for starting and stopping streaming. However, other audio control buttons may be provided for within status bar 111, such as a skip function and a scan function, as is known to one of ordinary skill in the art. A volume slider 113 may also allow a user to control the volume associated with a master device. Wireless connection button 115 allows a user to review the current connection between the master device and the current audio source and may also allow a user to select other available audio sources in order to switch the master device connection between other available devices or audio sources. Tethering button 117 initiates a tethering process, whereby a second slave device may be detected and tethered to the master device, using the graphical user interface, and in accordance with the present disclosure.

Figure 7B:
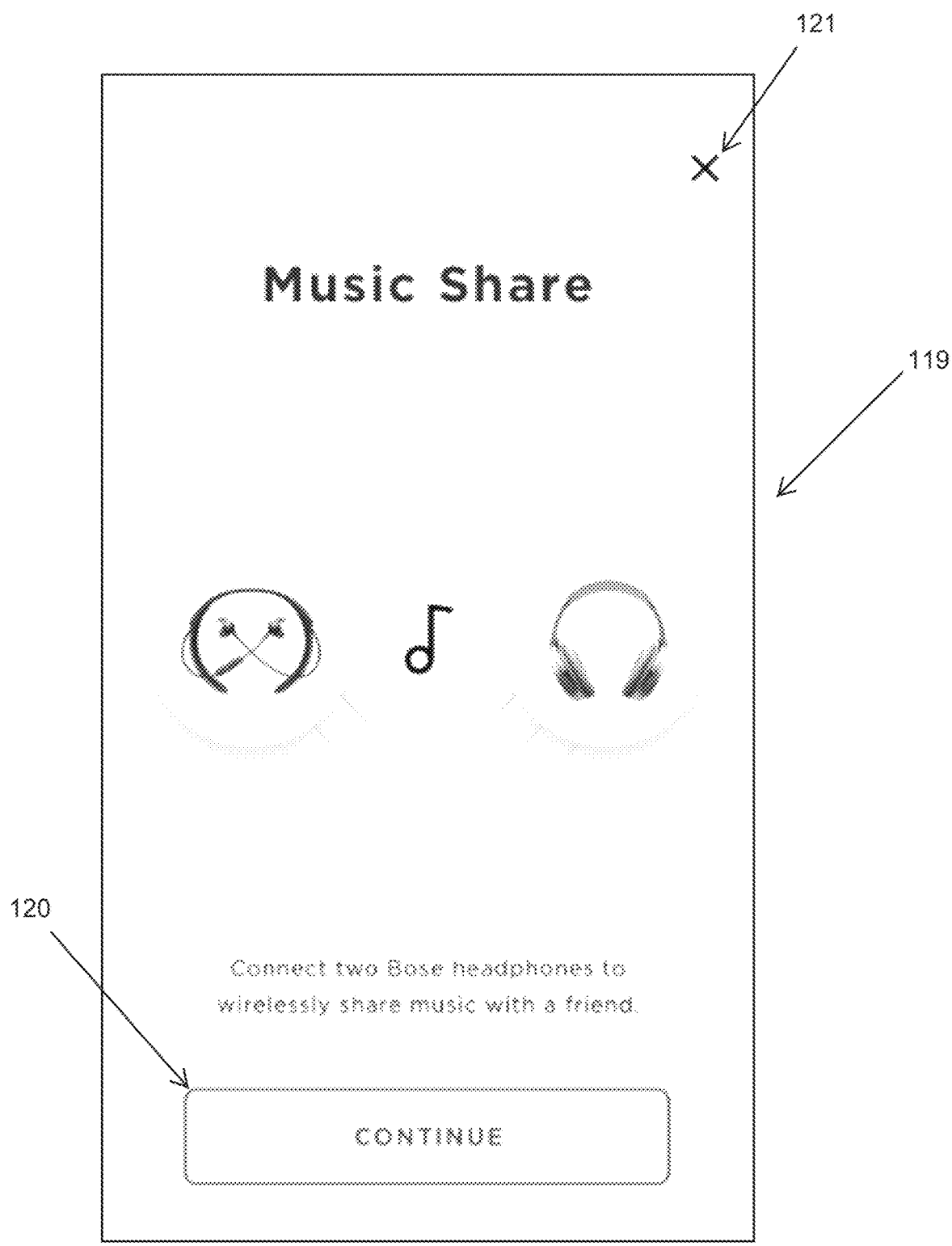
FIG. 7B is an example of a music share screen for a graphical user interface for a tethering program in one example of the present disclosure.
Figure 7C:
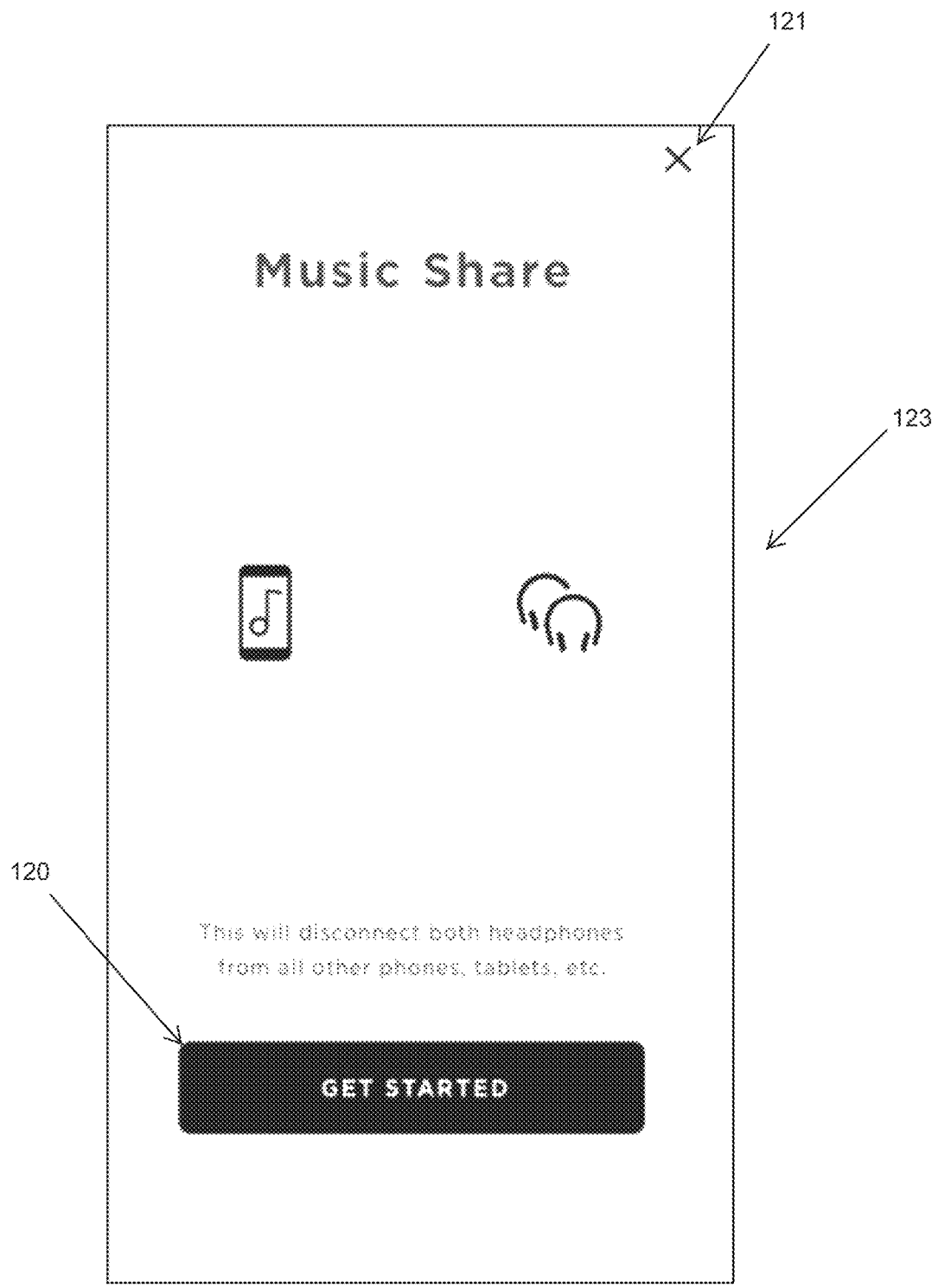
FIG. 7C is an example of a connection warning screen for a graphical user interface for a tethering program in one example of the present disclosure.

After tethering button 117 is selected by a user, the graphical user interface may display a series of intermediary screens in some examples. FIG. 7B shows a music share screen 119 that informs a user that they are navigating away from home screen 100 and have initiated a tethering process. A user may then select to continue by selecting continue button 120 or may cancel the tethering request by selecting the cancel button 121. If the continue button is selected a user may be presented with a second intermediary screen, which may be a connection warning screen 123 as shown, for example, in FIG. 7C. A connection warning screen 123 may inform a user that proceeding with the tethering process may interrupt their current wireless connection to an audio source, and ask the user to confirm again that they wish to proceed by selecting continue button 120 or cancelling the tether request with cancel button 121. In some examples, the music share screen 119 and the connection warning screen may not be necessary and selection of tethering button 117 on home screen 100 may immediately launch a tethering process.

Figure 7D:
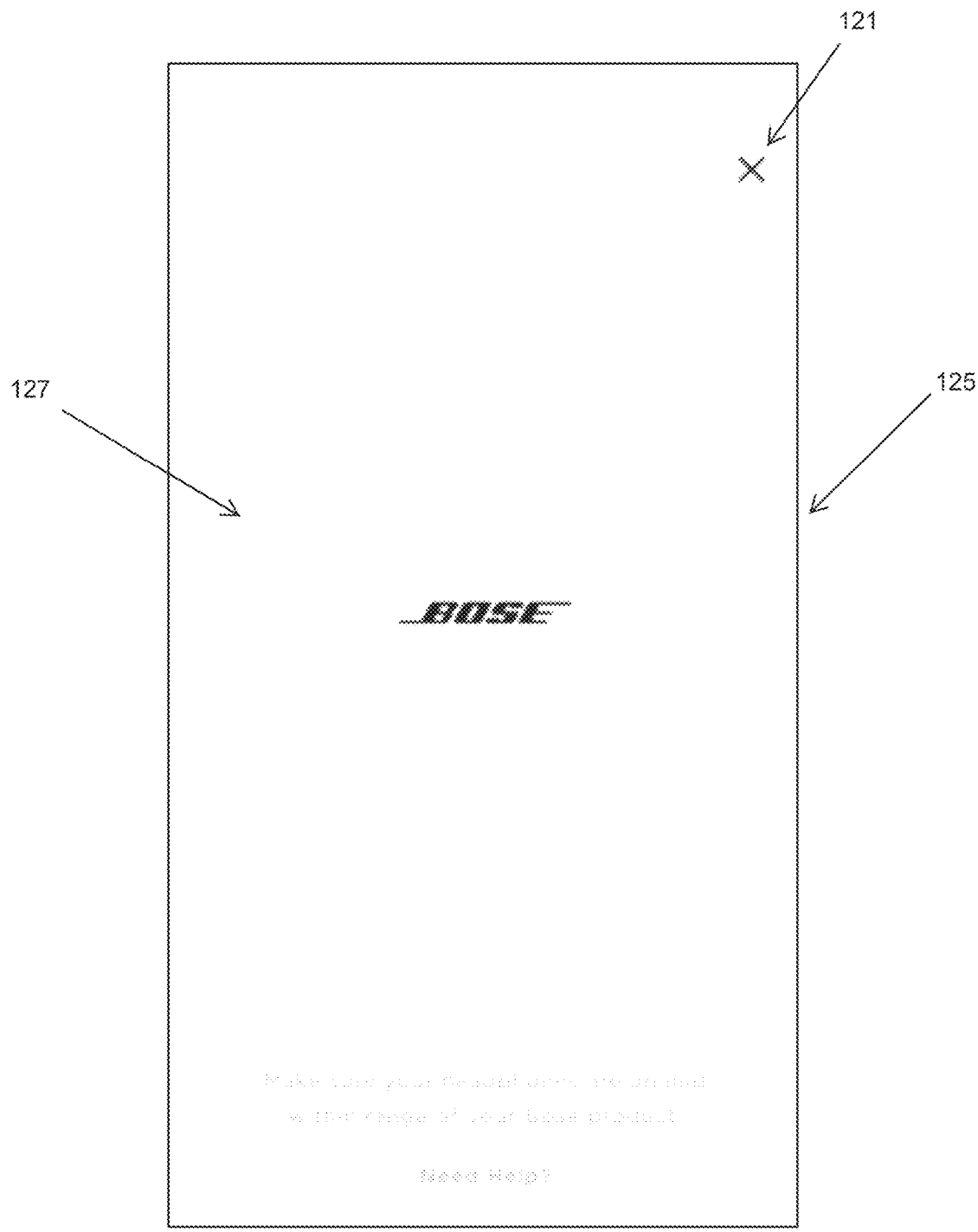
FIG. 7D is an example of a device inquiry screen for a graphical user interface for a tethering program in one example of the present disclosure.

FIG. 7D shows a device inquiry screen 125. Once a tethering process has been initiated the current audio source or secondary computing device to which the master audio device was previously connected begins determining whether any potential slave audio devices are present and able to communicate with the secondary computing device. The device inquiry screen may include a graphical inquiry indicator 127, which suggests that a wireless inquiry is taking place. The graphical inquiry indicator 127 may be either static or animated. The device inquiry screen may also include a cancel button 121 for canceling a tethering request if the device inquiry process lags or if the user otherwise wishes to cancel the tethering request.

Figure 7E:
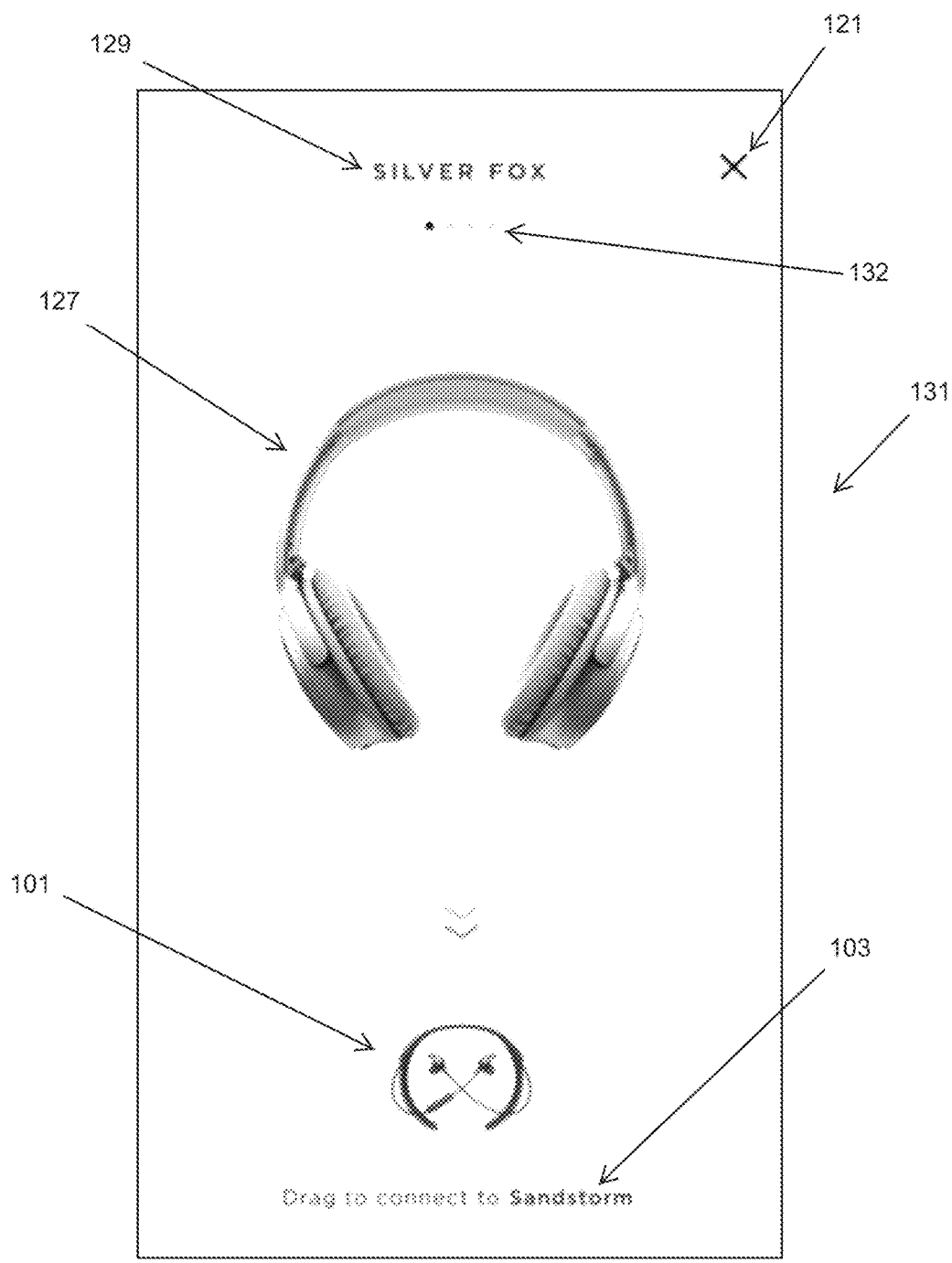
FIG. 7E is an example of a tethering screen for a graphical user interface for a tethering program in one example of the present disclosure.

FIG. 7E shows a tethering screen 131, which presents the results of any available devices that were identified during the device inquiry period. As shown, the tethering screen may present a selectable depiction of a potential slave device 127, along with a device identifier 129 such as a device name, in some examples. A graphical depiction of a master device 101 may also be presented on the tethering screen either with or without a master device identifier 103. Any additionally available slave devices may also be viewed by swiping left or right on the secondary device touchscreen. Cycle indicator 132 depicts a queue of available potential slave devices to which the master device may tether. Once a desired slave device has been identified a user may initiate tethering by dragging and dropping the selectable depiction of a potential slave device 127 toward the graphical depiction of the master device 101, upon which the secondary computing device initiates wireless tethering. Again, a user may cancel the tethering request by selecting cancel button 121.

Figure 7F:
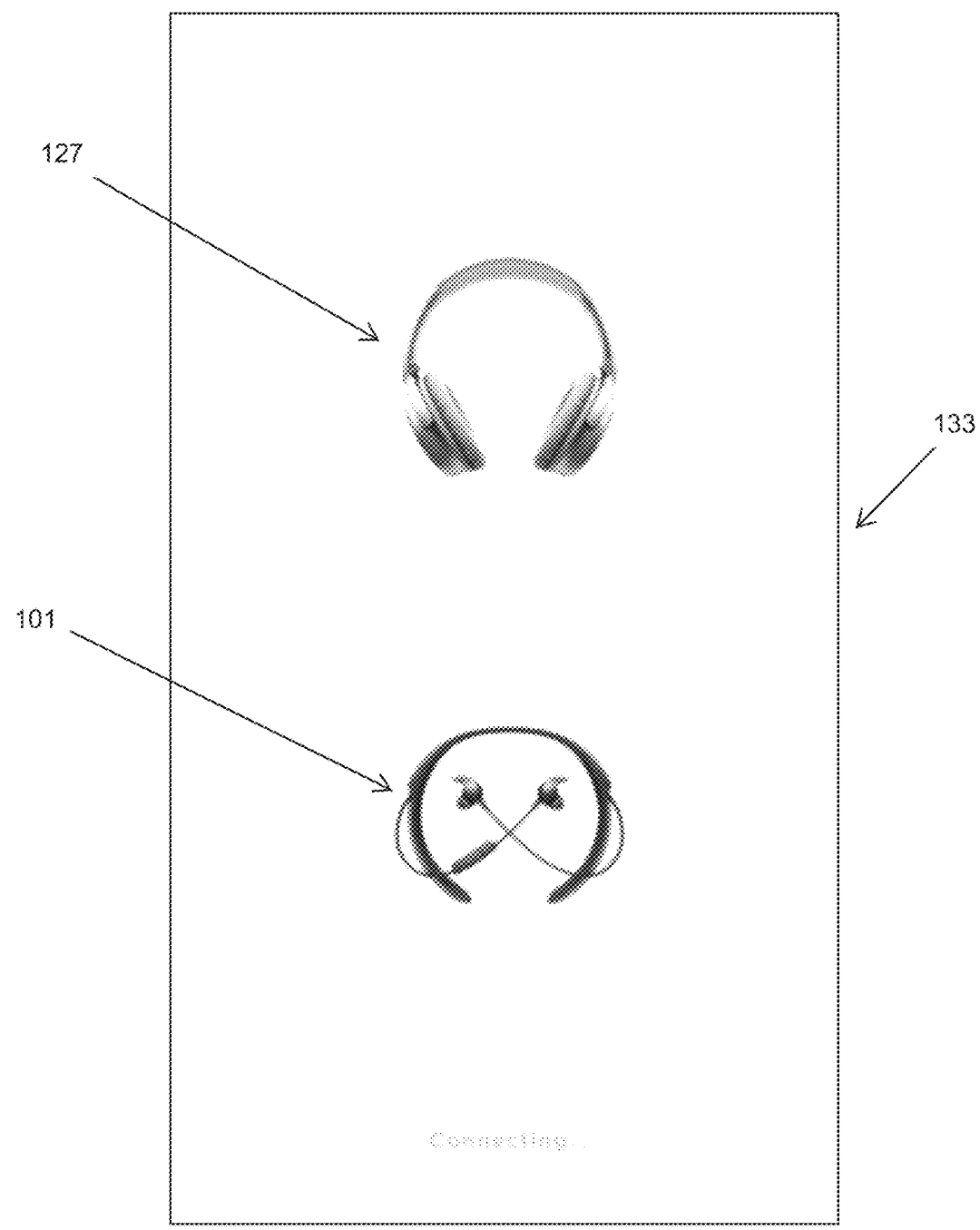
FIG. 7F is an example of a handshake screen for a graphical user interface for a tethering program in one example of the present disclosure.

FIG. 7F depicts a handshake screen 133, which may appear as an intermediary screen while the tethering process takes place and a wireless connection is formed between the master and slave devices. As shown, the handshake screen may provide a graphical depiction of a master device 101 along with a graphical depiction of a slave device 127 in a setting suggesting that a wireless handshake is currently taking place between the master and slave devices. Again the handshake screen may be animated or static. The screen also may or may not include a textual indicator that the selected audio devices are currently connecting. In some examples of the graphical user interface, handshake screen 133 may not be necessary and this screen may be omitted in some examples.

Figure 7G:
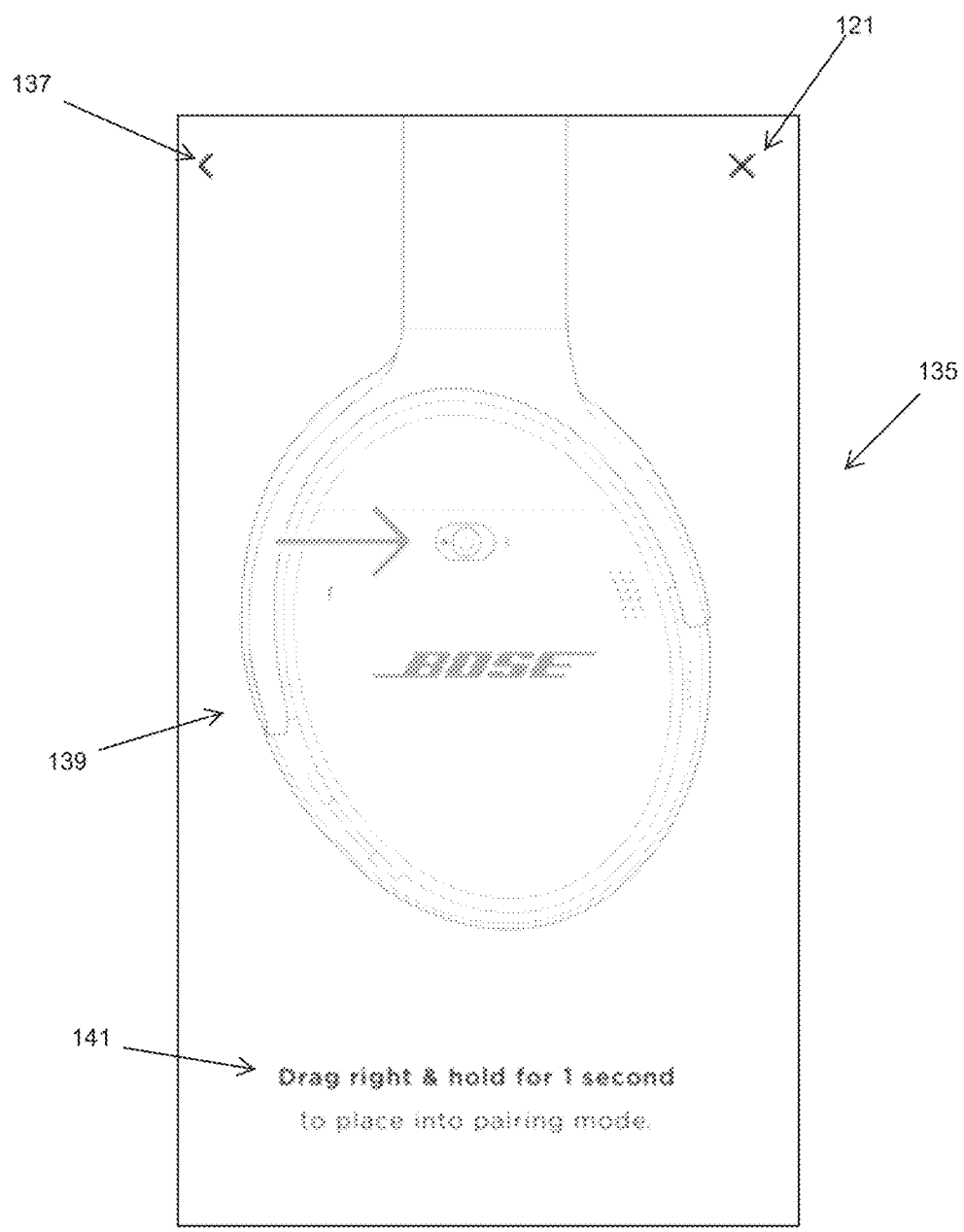
FIG. 7G is an example of a pairing screen for a graphical user interface for a tethering program in one example of the present disclosure.

FIG. 7G depicts a pairing screen 135, which may appear in some instances when the master and slave devices have not previously been paired together. In such instances it may be necessary for a user to manually pair the devices in a traditional manner to allow future tethering sessions to proceed automatically through use of the graphical user interface. In such cases, a pairing screen 135 may provide guidance to a user and instructions on how to enable a manual pairing mode. For example, a pairing screen 135 may include a graphical instruction 139 and/or a textual instruction 141 that explains how a user may initiate manual pairing of the master and slave devices. Once manual pairing has been accomplished a user may select back button 137 to return to a handshake screen 133. Alternatively, a user may cancel the tethering request by selecting cancel button 121.

Figure 7H:
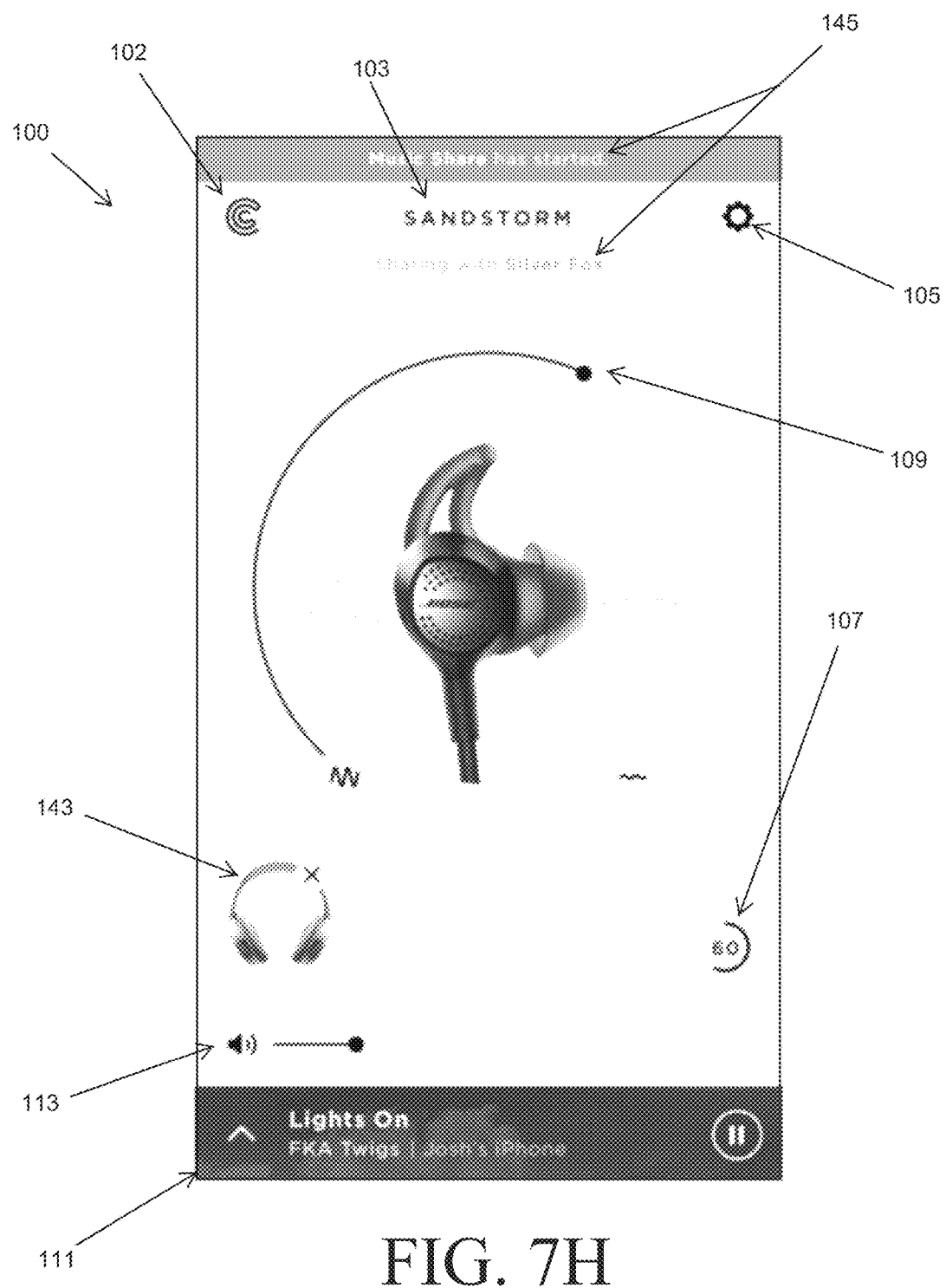
FIG. 7H is an example of a home screen for a graphical user interface for a tethering program after tethering has been accomplished in one example of the present disclosure.

FIG. 7H depicts a home screen 100 after wireless tethering between master and slave audio devices has been accomplished. In this example, home screen 100 is substantially similar in terms of appearance and available functions as before wireless tethering was accomplished. Again, home screen 100 includes a graphical depiction of a presently connected master device 101, along with a name associated with the master device 103, an application information icon 102, settings button 105, power indicator 107, slider 109, status bar 111, and volume slider 113. These buttons and sliders may now control the reproduction of audio information on both the master and slave devices. However, in some examples, wireless connection button 115 and tethering button 117 may no longer be available after tethering has been accomplished and may instead be replace by a slave icon 143. Slave icon 143 provides a selectable button for untethering the slave device from the master device. Textual sharing indicator 145 also provides a written indication regarding the status of the tethering feature, such as whether it has been activated and the identity of any devices to which the master device has been tethered. Upon untethering, home screen 100 may once again include wireless connection button 115 and tethering button 117, as previously described with respect to FIG. 7A, above.

While the disclosed subject matter is described herein in terms of certain exemplary implementations, those skilled in the art will recognize that various modifications and improvements can be made to the disclosed subject matter without departing from the scope thereof. As such, the particular features claimed below and disclosed above can be combined with each other in other manners within the scope of the disclosed subject matter such that the disclosed subject matter should be recognized as also specifically directed to other implementations having any other possible permutations and combinations. It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

What is claimed:

1. A wireless audio device tethering system comprising:
   an intermediary device having at least one wireless transceiver;
   wherein said intermediary device is configured to establish at least a first wireless connection with a first wireless audio device and at least a second wireless connection with a second wireless audio device;
   wherein said intermediary device is further configured to receive a unique identifier from said second wireless audio device and to transmit said unique identifier to said first wireless audio device for establishing a third wireless connection between said first and second wireless audio devices.

2. The wireless audio device tethering system of claim 1, wherein said first and third wireless connections operate on the same channel.

3. The wireless audio device tethering system of claim 1, wherein said intermediary device further comprises an audio source capable of streaming wireless audio signals to at least said first wireless audio device.

4. The wireless audio device tethering system of claim 1, wherein said second wireless connection comprises a Bluetooth Low Energy signal.

5. The wireless audio device tethering system of claim 4, wherein said first wireless connection comprises a Bluetooth low energy signal, a Bluetooth Serial Port Profile signal, or an iPod Accessory Profile signal to said first wireless audio device.

6. The wireless audio device tethering system of claim 3, wherein said intermediary device transmits streaming audio data over a fourth wireless connection.

7. The wireless audio device tethering system of claim 6, wherein said fourth wireless connection comprises a Bluetooth wireless connection and said audio data is streamed using the Bluetooth Advanced Audio Distribution Profile.

8. The wireless audio device tethering system of claim 7, wherein said third wireless connection comprises a Bluetooth wireless signal for streaming said audio data to said second wireless audio device using the Bluetooth Advanced Audio Distribution Profile.

9. The wireless audio device tethering system of claim 1 further comprising a second intermediary device that is at least initially in digital communication with said second wireless audio device.

10. The wireless audio device tethering system of claim 9, wherein said first intermediary device is configured to receive said unique identifier from said second wireless audio device through said second intermediary device.

11. The wireless audio device tethering system of claim 1, wherein said first wireless audio device and said second wireless audio device comprise headsets including at least one speaker and at least one microphone for receiving voice data.

12. The wireless audio device tethering system of claim 11, wherein said third wireless connection comprises a Bluetooth wireless connection for streaming voice data using the Bluetooth hands-free profile.

13. The wireless audio device tethering system of claim 12, further comprising a wireless connection between said first wireless audio device and said second wireless audio device for streaming audio data.

14. The wireless audio device tethering system of claim 8, wherein said intermediary device is configured to receive user inputs via a graphical user interface, said user inputs indicating a desire to tether said first wireless audio device with said second audio device.

15. The wireless audio device tethering system of claim 8, wherein said first wireless audio device and said second wireless audio device comprise headsets including at least one speaker and at least one microphone for receiving voice data, headphones, or a sound system.

16. The wireless audio device tethering system of claim 8, wherein said intermediary comprises a smartphone, a tablet, a laptop computer, or a sound system.

17. A method for tethering wireless audio devices comprising:
- establishing a first wireless connection between a first audio source and a first intermediary device for transmitting control information;
- establishing a second wireless connection between said first intermediary device and a second wireless audio device;
- receiving a unique identifier at said first intermediary device regarding said second wireless audio device via said second wireless connection;
- transmitting said unique identifier to said first wireless audio device via said first wireless connection;
- transmitting an instruction to said first wireless audio device, via said first wireless connection, to initiate wireless tethering between said first wireless audio device and said second wireless audio device for streaming audio data to said second wireless audio device via a third wireless connection; and
- transmitting audio data to said first wireless audio device for streaming to said second wireless audio device via said third wireless connection.

18. The method of claim 17, wherein said first wireless connection and said third wireless connection are formed over the same wireless channel.

19. The method of claim 17, wherein said audio data is transmitted from said first intermediary device to said first wireless audio device.

20. The method of claim 17, wherein said second wireless connection comprises a Bluetooth Low Energy signal.

21. The method of claim 17, wherein said first wireless connection comprises a Bluetooth Low Energy signal, a Bluetooth Serial Port Profile signal, or an iPod Accessory Profile signal.

22. The method of claim 19, further comprising the steps of establishing a fourth wireless connection between said first intermediary device and said first wireless audio device and wherein said audio data is transmitted to said first wireless audio device over said fourth wireless connection using the Bluetooth Advanced Audio Distribution Profile.

23. The method of claim 21, wherein said third wireless connection is a Bluetooth wireless signal and said audio data is transmitted using the Bluetooth Advanced Audio Distribution Profile.

24. The method of claim 18, wherein said second wireless connection is made over a wide area network.

25. The method of claim 18, further comprising transmitting an instruction to said first wireless audio device, via said first wireless connection, to initiate wireless tethering between said first wireless audio device and said second wireless audio device for transmitting voice data via a fifth wireless connection.

26. The method of claim 25, wherein said fifth wireless connection is a Bluetooth wireless signal and said voice data is transmitted using the Bluetooth Hands-Free Profile.

27. A wireless audio device tethering system comprising:
- an intermediary device comprising a processor, memory in communication with said processor, a transceiver in communication with said processor for communicating wirelessly with at least a first wireless audio device and a second wireless audio device, and a display in communication with the processor;
- wherein said processor is configured to provide a user interface, comprising: a home screen including at least one selectable tethering button for initiating a tethering request between said first and second wireless audio devices; a tethering screen including a graphical depiction of at least said first wireless audio device and said second wireless audio device, wherein at least one of said graphical depictions configured to be dragged and dropped on the other, thereby initiating wireless tethering between said first and second wireless devices.

* * * * *